(12) United States Patent
Rosenthal et al.

(10) Patent No.: US 11,897,823 B2
(45) Date of Patent: Feb. 13, 2024

(54) PRODUCTION OF NITROGENOUS FERTILIZER FROM WASTEWATER

(71) Applicant: PWG LLC, Sarasota, FL (US)

(72) Inventors: Edward Rosenthal, Sarasota, FL (US); Griffith Lunn, Titusville, FL (US)

(73) Assignee: PWG LLC, Sarasota, FL (US)

( * ) Notice: Subject to any disclaimer, the term of this patent is extended or adjusted under 35 U.S.C. 154(b) by 0 days.

(21) Appl. No.: 17/962,455

(22) Filed: Oct. 7, 2022

(65) Prior Publication Data

US 2023/0145712 A1    May 11, 2023

Related U.S. Application Data

(60) Provisional application No. 63/278,294, filed on Nov. 11, 2021.

(51) Int. Cl.
| | |
|---|---|
| *C05C 3/00* | (2006.01) |
| *C05G 5/35* | (2020.01) |
| *C05G 5/30* | (2020.01) |
| *C02F 1/20* | (2023.01) |
| *C02F 1/66* | (2023.01) |
| *C02F 1/02* | (2023.01) |
| *C05F 7/00* | (2006.01) |
| *C02F 101/16* | (2006.01) |

(52) U.S. Cl.
CPC ............ *C05C 3/005* (2013.01); *C02F 1/02* (2013.01); *C02F 1/20* (2013.01); *C02F 1/66* (2013.01); *C05F 7/00* (2013.01); *C05G 5/35* (2020.02); *C05G 5/38* (2020.02); *C02F 2101/16* (2013.01)

(58) Field of Classification Search
CPC ....................................................... C05C 3/005
See application file for complete search history.

(56) References Cited

U.S. PATENT DOCUMENTS

| | | | |
|---|---|---|---|
| 10,676,374 B1 | 6/2020 | Lunn et al. | |
| 2004/0045331 A1* | 3/2004 | Geiger | C08G 18/36 71/28 |

* cited by examiner

*Primary Examiner* — Peter Keyworth
(74) *Attorney, Agent, or Firm* — Hershkovitz & Associates, PLLC; Abe Hershkovitz; Eugene C. Rzucidlo

(57) ABSTRACT

An ammonia capture and recovery system comprises five process steps, including an ammonia removal step, an ammonia recovery step, a product granulation step, a granulated product wax-coating step, and a granulated product encapsulation step. These steps are modular in that multiple approaches are valid for each step if it meets the process requirements for the next influent. Also, a method of taking ammonia-containing wastewater and producing several water fractions (preferably of decreasing volume and increasing purity) and a time-release ammonium-containing fertilizer, resulting in a sustainable nitrogenous fertilizer product that reduces fertilizer use and subsequent nutrient runoff while being produced from wastewater and not fossil fuel or hydrogen sources.

5 Claims, 6 Drawing Sheets

PRODUCTION OF NITROGENOUS FERTILIZER FROM WASTEWATER

BACKGROUND OF THE INVENTION

1. Field of the Invention

The present invention generally relates to a process to produce an encapsulated nitrogenous fertilizer from wastewater.

2. Description of Related Art

Most of the ammonia nitrogen produced today for fertilizer is derived from atmospheric air (nitrogen) and hydrogen liberated from natural gas (methane) using the Haber-Bosch process. This is one of the largest single users of natural gas and uses over 1% of all anthropogenic energy consumption while producing a similar (1.4%) of all carbon dioxide emissions. Recent advances in so-called "blue" ammonia seek to reduce the carbon footprint of ammonia production by combining traditional Haber-Bosch processing with carbon sequestering such as deep well injection or converting the carbon dioxide to a solid form. This process still leads to some emissions and increases the energy consumption and costs of the produced ammonia. "Green" ammonia technologies similarly use non-fossil fuel hydrogen (such as by water electrolysis to produce hydrogen and oxygen) which with current technology requires far more energy (which itself may not be green) than traditional methods leading to still higher ammonia production costs which cannot be sustained for a commodity chemical crucial for agriculture.

Ammonia is also one of the major constituents in wastewater treatment (along with carbon and phosphorus). Wastewater treatment likewise uses over 1% of all electricity with secondary treatment (ammonia removal) being one of the biggest components. In a traditional wastewater treatment plant ammonia is exposed to nitrifying organisms in an aerobic environment to convert ammonia to nitrite and nitrate then subsequently exposed to an anaerobic environment and denitrifying bacteria to produce Nitrogen gas. The first step consumes alkalinity while the $2^{nd}$ step consumes a carbon source as a terminal electron acceptor. This process removes the ammonia from the wastewater but puts the nitrogen back in the atmosphere where it needs to be converted again to ammonia via the Haber-Bosch process starting the whole cycle over again.

The above process is a crude brute force implementation of the nitrogen cycle which via mostly biological methods allows the fixing of atmospheric nitrogen and conversion to useful products for plant nutrition and the conversion of biomass and related products back to nitrogen gas. However, with the current industrial method significant amount of energy (and resulting hydrocarbons) is required to both convert nitrogen to ammonia and ammonia back to nitrogen just to simply do it again. Approaches to direct wastewater ammonia reuse have been limited to sludge-dewater concentrate treatment which still leads to most of the ammonia content being converted to nitrogen gas in the name of reducing capital and operating costs.

Various membrane and ionomer approaches exist to selectivity remove ammonia/ammonium from an aqueous solution. These methods theoretically allow ammonia recovery but have increased capital and operating expenses per unit water treated. The resulting ammonia brines tend to have various contaminations and co-products which combined with a concentrated aqueous ammonia solution is limited in feasibility (cost and ease of application/transport) as a fertilizer.

BRIEF SUMMARY OF THE INVENTION

The present invention relates to a process to produce an encapsulated nitrogenous fertilizer from wastewater. The present invention comprises an ammonia capture and recovery system that comprises 5 process steps, including an ammonia removal step, an ammonia recovery step, a product granulation step, a granulated product wax-coating step, and a granulated product encapsulation step. In brief, the present invention is directed to a method of taking ammonia-containing wastewater and producing several water fractions (preferably of decreasing volume and increasing purity) and a time-release ammonium-containing fertilizer for sale. The result is a sustainable nitrogenous fertilizer product that reduces fertilizer use and subsequent nutrient runoff while being produced from wastewater and not fossil fuel or hydrogen sources. The present invention is directed to an ammonia capture and recovery system that includes 5 process steps, including an ammonia removal step, an ammonia recovery step, a product granulation step, a granulated product wax-coating step, and a granulated product encapsulation step. These steps are modular in that multiple approaches are valid for each step if it meets the process requirements for the next step's influent.

This present process to produce a nitrogen-containing encapsulated fertilizer from waste is carried out using an ammonia capture and recovery system wherein the steps are carried out in a manner which allows economical treatment of wastewater to produce product water while also producing a saleable time-release granular ammonium salt product. The sale of this product helps offset the cost of operating the water treatment portion and the cost of consumables to sustain it to reduce total cost per treated gallon of wastewater. With the selection of efficient unit operations, the toll cost of water treatment can be used to subsidize the cost of the produced fertilizer as well. Ideally, each step is selected to make optimum products for the subsequent step, which minimizes duplication of effort and increases process efficiency.

Unlike most nitrogenous fertilizer compounds available for sale the produced time-release granulated ammonium salt product utilizes "green" ammonia, with no hydrocarbons used in its formation, besides if they are used to make some of the other consumables or power used in the process. Likewise, hydrogen is not used in this process and 100% of the Nitrogen in the product is sourced from wastewater nitrogen (ammonia). With a portion of nitrogenous wastewater being from fertilizer run-off, this process and the resulting fertilizer product helps reduce this runoff to the environment and reduces the total effort needed to treat the resulting wastewater which is a self-solving problem.

BRIEF DESCRIPTION OF THE DRAWINGS

The features and advantages of the present invention will become apparent from the following detailed description of a preferred embodiment thereof, taken in conjunction with the accompanying drawings in which.

DETAILED DESCRIPTION OF THE INVENTION

The present invention is directed to a method of obtaining a granulated nitrogen-containing encapsulated fertilizer product from wastewater. The process includes an ammonia capture and recovery system that includes 5 process steps, including an ammonia removal step, an ammonia recovery step, a product granulation step, a granulated product wax-coating step, and a granulated product encapsulation step. These steps are modular and various temperatures and/or pressures can be employed in each step if it meets the process requirements for the next step's influent. When combined this process leads to a method for the manufacture of an encapsulated nitrogen-containing product from wastewater, as well as various product water streams.

Figure 1:
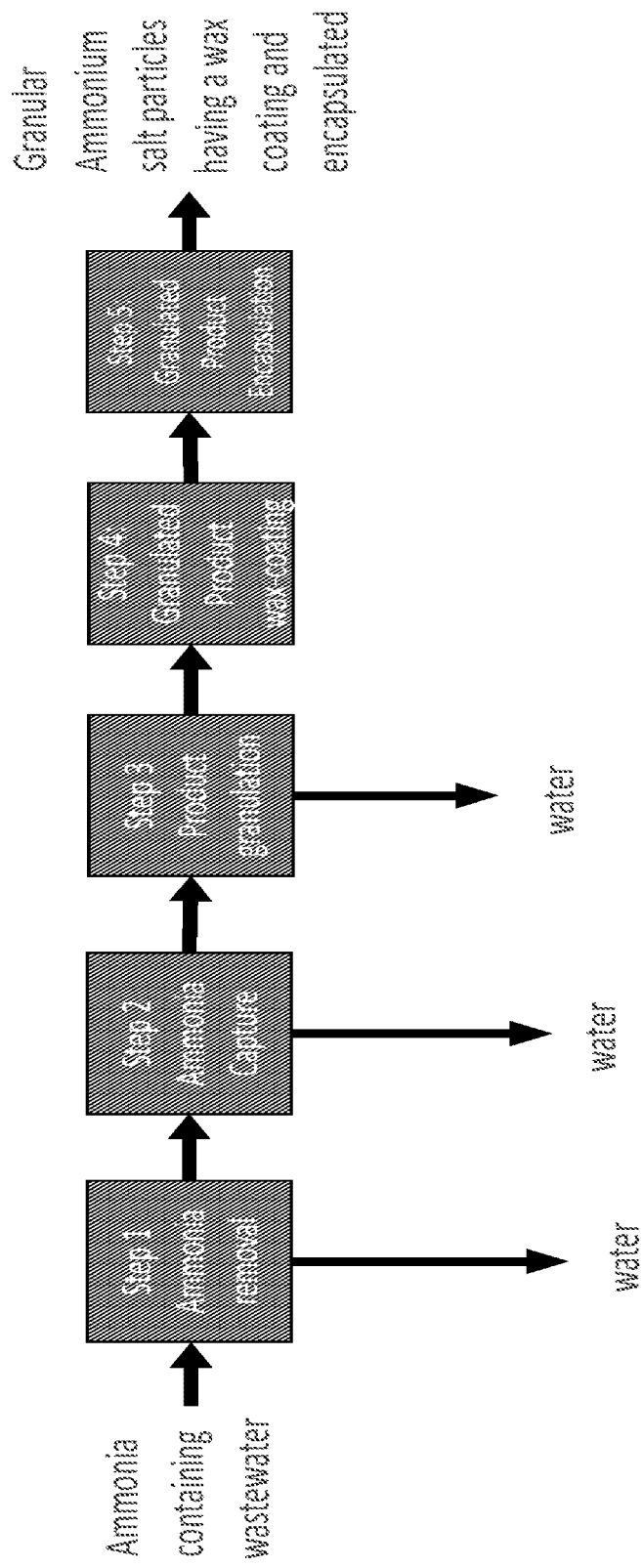
FIG. 1 illustrates the overall process steps of the present invention.

FIG. 1 is an overview diagram which illustrates the overview of the process flow diagram of the present invention noting key influent and product streams; including influent wastewater containing ammonia values and producing 3 different water streams differing in volume and concentration of other ions along with a product stream of solid granulated ammonium salt waxed and encapsulated for sale.

Figure 2:
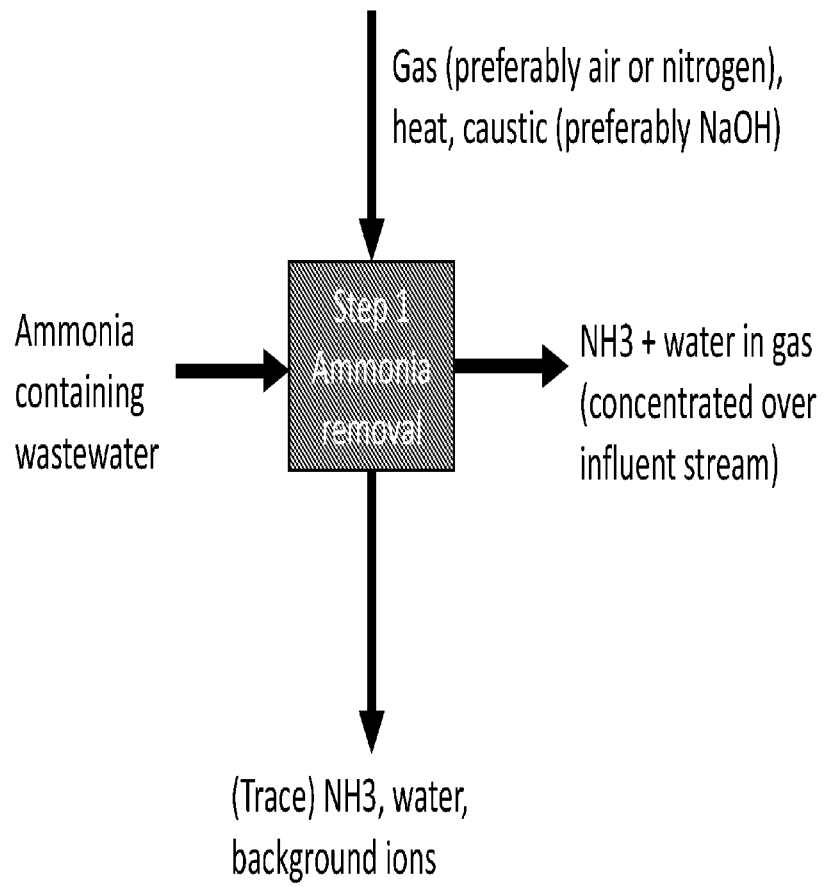
FIG. 2 illustrates the 1st process of FIG. 1

FIG. 2 illustrates the first process block of FIG. 1. which comprises an ammonia removal step. This unit operation takes an influent of ammonia-containing wastewater (as well as alkalinity, gas, and heat. All ammonia removing processes require elevated pH (by adding caustic (preferably NaOH) or similar alkaline bases to increase alkalinity). This is due to the pKa of ammonia being 9.4. Removing ammonia subsequently reduces pH and more alkalinity is added to sustain proper operating conditions. This block then produces a product water with trace ammonia as well as a separate stream of gas with entrained ammonia and water at a much higher concentration than the influent water stream.

Figure 3:
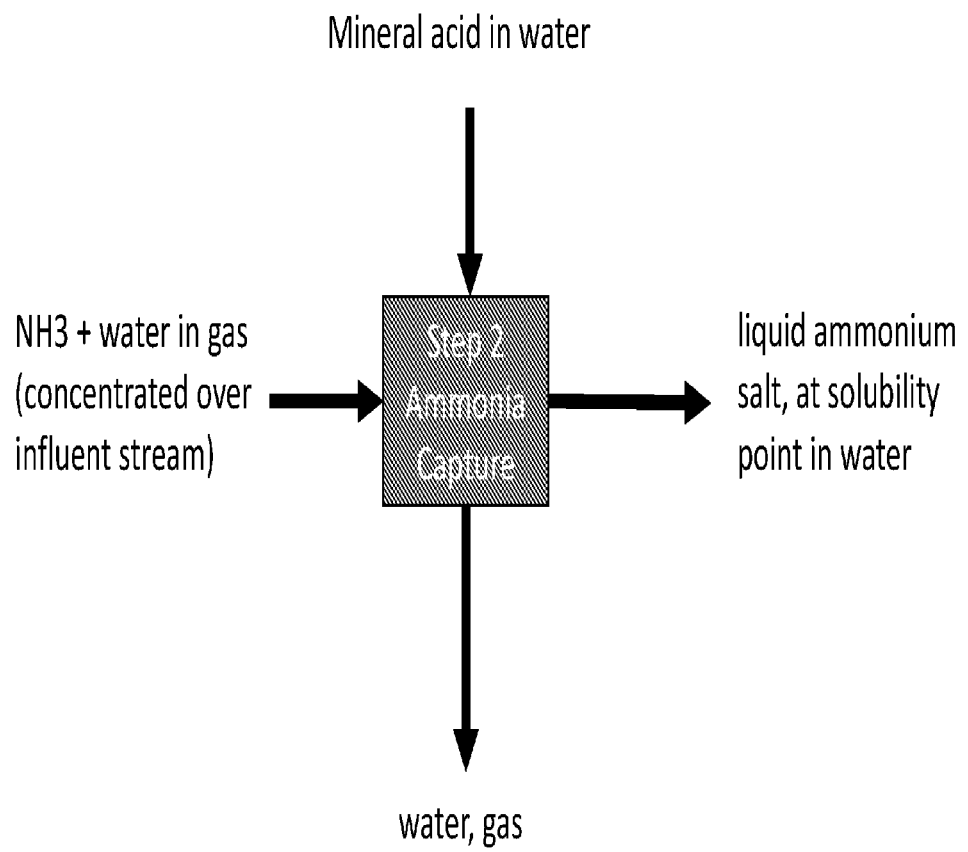
FIG. 3 illustrates the 2nd process of FIG. 1

FIG. 3 illustrates the 2nd process block of FIG. 1. This block is an ammonia recovery step. This unit operation takes an influent of gas entrained with ammonia and water (the effluent of the first unit operation) as well as an influent of mineral acid in water. Mineral acids include but are not limited to sulfuric acid, hydrochloric acid, phosphoric acid, or nitric acid. This block then produces another product water stream with dried gas effluent as well as a liquid ammonium salt dissolved in water to the solubility point of the ammonium salt.

Figure 4:
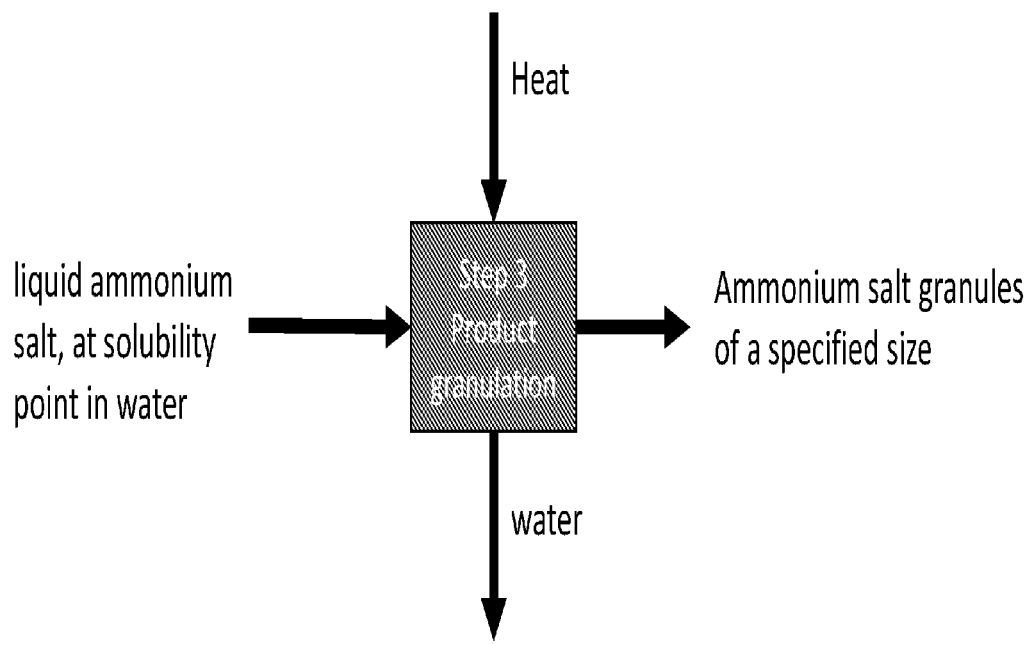
FIG. 4 illustrates the 3rd process of FIG. 1

FIG. 4 illustrates the 3rd process block of FIG. 1. This process step comprises a product granulation step. This unit operation takes an influent of dissolved ammonium salt in water (the effluent of the $2^{nd}$ unit operation) as well as heat. This block then produces another product water stream as well as an ammonium salt granulated product. Particles having a particular range of particle size distribution can be provided in this step.

Figure 5:
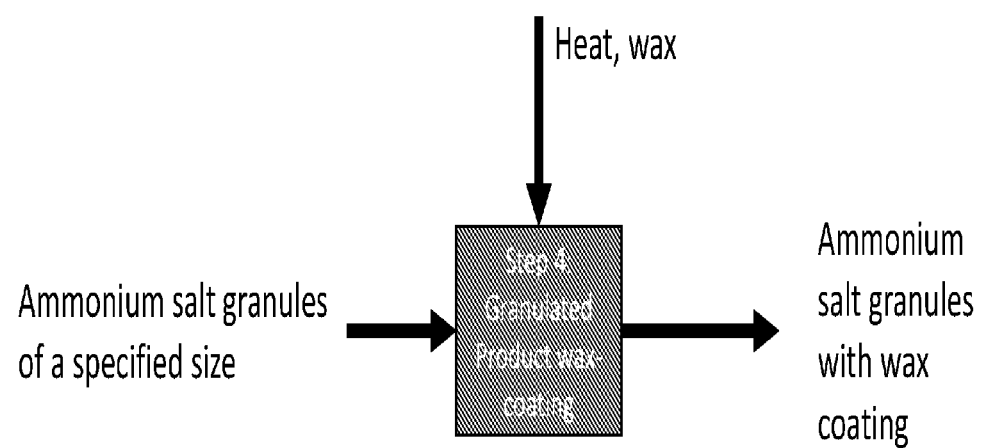
FIG. 5 illustrates the 4th process of FIG. 1

FIG. 5 illustrates the 4th process block of FIG. 1. This product comprises a wax coating step. This unit operation takes an influent ammonium salt granulated product optionally having a desired particle size distribution (the effluent of the $3^{rd}$ unit operation) as well as heat and a wax component to coat the particles. Examples of such waxes include paraffin wax, hardened oils, bee wax, Japan wax, rosin, petroleum resins and the like. The organic wax can be for example petroleum waxes, polyurethane waxes, synthetic waxes, natural waxes, and hydrogenated triglycerides. This block then produces an ammonium salt granulated product that is wax-coated.

Figure 6:
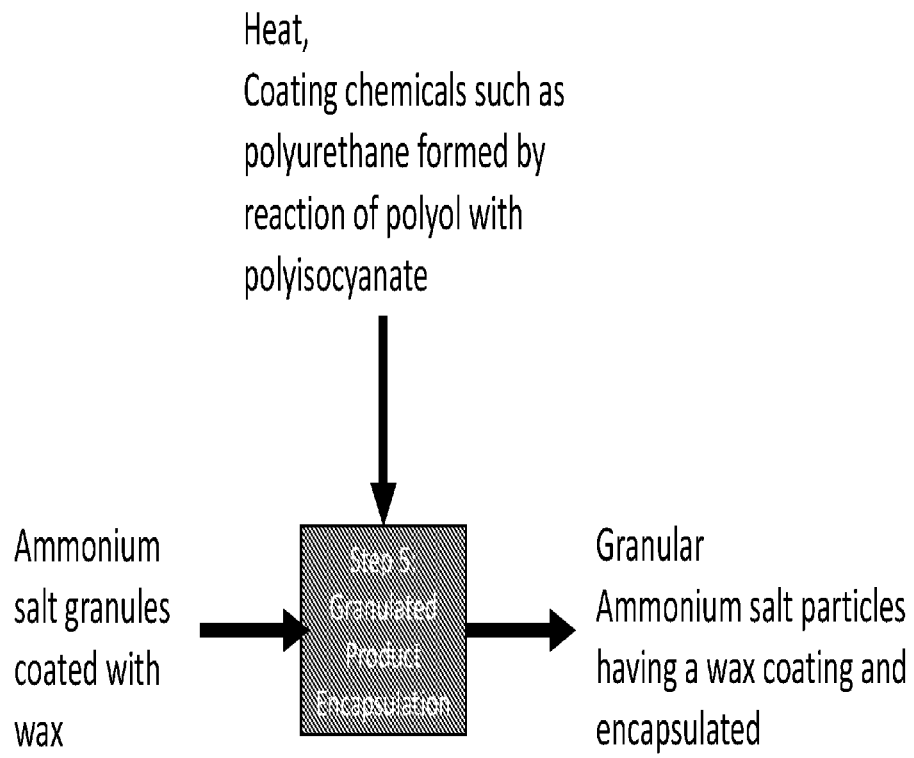
FIG. 6 illustrates the 5th process of FIG. 1

FIG. 6 illustrates the 5th process block of the present invention which comprises of a product encapsulation step. This unit operation takes an influent ammonium salt granulated and wax coated product (the effluent of the $4^{th}$ unit operation) as well as heat and the coating components. Illustrative in the figure is the formation of a polyurethane coating by reaction of a polyol with a polyisocyanate. This block then produces an ammonium salt granulated product that is wax-coated and encapsulated to provide the desired time-release characteristics for nitrogen-containing fertilizer.

The steps of the present process will now be described. Each step is a new technology development which has never been done before with ammonia recaptured from wastewater. Step 1 of the present process takes a wastewater stream containing ammonia, in water, with any other materials present and inputs a gas (such as for example, air or nitrogen). The step 1 milieu is optionally heated but that is not required. The step 1 process is carried out under atmospheric pressure but can also be carried out under reduced pressure. The process of step 1 is carried out optionally under alkaline conditions of alkalinity. The process produces a stream with enhanced ammonia and an effluent stream of "treated" wastewater, with less ammonia. This effluent stream has gained value since it can either be discharged or re-used where it meets the requirements. The gas stream in step 1 containing ammonia and water and other species.

A preferred method is the NASA licensed "Struvite" technology in U.S. Pat. No. 10,676,374 B1. However, any method that produces the same function block will work. This includes any gas stripping or stream stripping processes, commonly used in bulk chemicals and oil and gas industries. This also includes any future technologies that have the same mass balance. For example, in a new technology novel development part of the present invention which is the ammonia capture step. A gas stream containing ammonia and water and other species is treated. This varies in composition based on the method chosen for step 1.

Step 2 of the present invention is the ammonia capture step. A gas stream containing ammonia and water and other species is treated. This varies in composition based on the method chosen for step 1. Step 2 takes an input of mineral acid having a concentration optionally between 10-97%. which is much higher than other "wet gas scrubbers" used for ammonia removal/capture. Step 2 produces an effluent stream of excess water and gases carried over from step 1. There could be trace mineral acid and ammonia in this stream, but it will be minimal. The excess water can be another product stream. Step 2 also provides a product stream of a saturated solution of liquid ammonium salt in water at the specific solubility point for that ammonia salt at room temperature. Adjusting water content of the mineral acid is needed to hit this number based on other variables.

The present process makes ammonia in gas form to run through an optimized product recovery system that makes the proper compound, i.e., ammonium mineral acid salt for granulation. This allows the use of a much simpler (and scalable) approach using contact columns of concentrated mineral acid to form granular ammonium salts of the mineral acid. Mineral acids such as, for example, sulfuric acid and nitric acid can be used.

Step 3 is a new technology novel development part of the present process which is a product granulation step. Step 3 utilizes the feed stream of a saturated solution of liquid ammonium salt in water from step 2. This step takes an input of heat such as for example steam or direct heating while also producing an effluent stream of product water. This action also produces a product stream of granulated ammonium salt optionally at an optional particle size and other requirements. If needed any other waste stream having smaller than optional particle sizes can be recycled. The preferred method for step 3 is any of the granulation methods available by the major granulation vendors. The preferred method for step 3 is any of the granulation methods commercially available including but not limited to rotary dryers, reactors, crystallizers, and other specific methods by the major granulation vendors.

It is notable that the present 5 step invention here is that the present 5-step process produces an ideal step 2 effluent (saturated liquid ammonium salt with no contaminants) for this process to be as simple as possible. In this process it's easier to design step 1 and step 2 together to produce the optimal product stream. So due to how step 1 and step 2 are performed according to the block diagram, this allows most vendor's granulation approaches to be viable for this process.

Step 4 is a new technology novel development part of the present process which is a wax coating step of the ammonium salt granules from step three with a wax. This step takes an input of heat such as for example steam or direct heating as well as an input of wax while producing a product of wax-coated ammonium salt granules. The nature of the wax is not critical and any wax which is known to be useful in the coating of fertilizer particles can be used. Waxes such as hydrocarbon waxes polyethylene waxes and polyurethane waxes, for example can be used as the coating waxes for the nitrogen salt particles from step 3. These coatings are very thin and act as a moisture barrier and prevent acid breakdown. Wax can be applied to the ammonia salt granule at 1% to 2% wax coating depending on the level determined of water permeability into the granulated ammonia salt. The wax will reduce the enhanced solubility of an ammonium salt in a granule in an organic green ammonia. The wax must also be selected to have a melting point high enough to allow bulk transport of the product without amalgamation.

The waxes used in the present invention may be any waxes if they are soluble in solvents for the essential polymers. Examples of such waxes include paraffin wax, hardened oils, bee wax, Japan wax, rosin, petroleum resins and the like. The organic wax can be for example petroleum waxes, polyurethane waxes, synthetic waxes, natural waxes, and hydrogenated triglycerides. The polyol is an isocyanate-reactive polyol such as for example a polyether polyol or a polyester polyol.

Step 5 is the particle encapsulation step. Such encapsulations are well known in the coated fertilizer art area. Encapsulation is performed to obtain benefits such as for example ideal time release properties. The present process is distinguishable from the prior in providing an elegant means for obtaining granular nitrogen salts from wastewater which can then be coated with wax and an outer encapsulation layer.

An example of providing a controlled release fertilizer is to encapsulate the wax coated ammonium salt granules with a polyurethane obtained by the reaction of a polyisocyanate and a polyol. The isocyanate can be, for example a diisocyanate, or a polyisocyanate. A non-limiting example of a diisocyanate is polymeric MDI (4,4 diphenylmethane diisocyanate), however, other poly-functional isocyanates can be utilized and include aliphatic, aromatic, and aliphatic aromatic polyisocyanates. Isocyanates containing two or more NCO groups available for reaction and, as known to one skilled in the art, are widely used in the production of urethane polymers.

Non-limiting examples of suitable isocyanates include: 1,6-hexamethylene diisocyanate, 1,4-butylene diisocyanate, furfuryurylidene diisocyanate, 2,4-toluene diisocyanate, 2,6 toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-ylylene diisocyanate, bis-(4-isocyanatophenyl)methane, bis-(3-methyl-4-isocyanatophenyl)methane, polymethylene polyphenyl polyisocyanates and mixtures thereof. MDI (4,4 diphenylmethane diisocyanate) is a preferred isocyanate.

The invention, which is set forth in this disclosure, is not to be limited either in spirit or scope by these examples. Those skilled in the art will readily understand that known variations of the conditions and processes of the following preparative procedures can be used to prepare these compositions.

What is claimed:

1. A method of obtaining a granulated nitrogen-containing encapsulated fertilizer product from wastewater, wherein the method comprises an ammonia capture and recovery system comprising five method steps, wherein the method steps include an ammonia removal step to produce a stream comprising a gas with entrained ammonia and water, an ammonia recovery step producing an ammonium salt by addition of a mineral acid to the gas with entrained ammonia and water, a granulation step of the ammonium salt forming a granulated product, a granulated product wax-coating step, and a granulated product encapsulation step.

2. The method of claim 1, wherein the method steps are carried out in a modular system and various temperatures and/or pressures can be employed in each step if it meets the process requirements for the next step's influent.

3. The method according to claim 1, comprises providing an alkaline pH, gas, and heat component to provide method operating conditions for the ammonium removal step using an influent of ammonia-containing wastewater.

4. The method of claim 3 comprises producing a product water with trace ammonia as well as a separate stream of gas with entrained ammonia and water at a higher concentration than the influent water stream.

5. The method according to claim 1, wherein the granulation step comprises heating a feed stream of a saturated solution of liquid ammonium salt in water to produce an effluent stream of product water and a product stream of granulated ammonium salt.

* * * * *